(12) United States Patent
Qu et al.

(10) Patent No.: US 12,575,559 B2
(45) Date of Patent: Mar. 17, 2026

(54) CRYOGENIC STORAGE AND RETRIEVAL APPARATUS AND CRYOGENIC STORAGE AND RETRIEVAL METHOD

(71) Applicant: SHANGHAI ORIGINCELL BIOLOGICAL CRYO EQUIPMENT CO., LTD., Shanghai (CN)

(72) Inventors: Jianguo Qu, Shanghai (CN); Lingling Liu, Shanghai (CN); Jianxin Wang, Shanghai (CN)

(73) Assignee: SHANGHAI ORIGINCELL BIOLOGICAL CRYO EQUIPMENT CO., LTD., Shanghai (CN)

( * ) Notice: Subject to any disclaimer, the term of this patent is extended or adjusted under 35 U.S.C. 154(b) by 864 days.

(21) Appl. No.: 17/800,509

(22) PCT Filed: Jul. 14, 2020

(86) PCT No.: PCT/CN2020/101758
§ 371 (c)(1),
(2) Date: Aug. 17, 2022

(87) PCT Pub. No.: WO2021/169148
PCT Pub. Date: Sep. 2, 2021

(65) Prior Publication Data
US 2023/0090865 A1 Mar. 23, 2023

(30) Foreign Application Priority Data
Feb. 27, 2020 (CN) .......................... 202010124341.5

(51) Int. Cl.
*A01N 1/145* (2025.01)
*A01N 1/147* (2025.01)
(Continued)

(52) U.S. Cl.
CPC ............. *A01N 1/145* (2025.01); *A01N 1/147* (2025.01); *B65D 43/26* (2013.01); *B65G 1/04* (2013.01);
(Continued)

(58) Field of Classification Search
CPC ........ A01N 1/145; A01N 1/147; B65D 43/26; B65G 1/04; B65G 47/905; B65G 47/912;
(Continued)

(56) References Cited

U.S. PATENT DOCUMENTS 5,233,844 A * 8/1993 Knippscheer ........... F25D 3/102
414/331.05
9,857,389 B2 * 1/2018 Endo ................ G01N 35/00584
(Continued)

FOREIGN PATENT DOCUMENTS

CN 105857932 A 8/2016
CN 105857937 A 8/2016
(Continued)

OTHER PUBLICATIONS

CN106395223A Machine English Translation (Year: 2017).*
(Continued)

*Primary Examiner* — Michael L Hobbs
*Assistant Examiner* — Lenora A Abel
(74) *Attorney, Agent, or Firm* — Christensen O'Connor Johnson Kindness PLLC

(57) ABSTRACT

Disclosed is a biological sample storage and retrieval apparatus, comprising a storage device, with the interior thereof being a cryogenic environment for storing a biological sample, and the biological sample comprising cryogenic vials and a cryogenic shelf for holding the cryogenic vials; an operation device detachably connected to the storage device for receiving a transfer tank for holding the biological sample and performing storage and retrieval of the biologi-
(Continued)

cal sample in the storage device by means of the transfer tank; and a sealing device, the sealing device being used for sealing the storage device when the storage device is detached from the operation device. A cryogenic storage and retrieval method is also provided.

15 Claims, 8 Drawing Sheets

(51) Int. Cl.

| | |
|---|---|
| *B65D 43/26* | (2006.01) |
| *B65G 1/04* | (2006.01) |
| *B65G 47/90* | (2006.01) |
| *B65G 47/91* | (2006.01) |
| *F25D 3/10* | (2006.01) |
| *F25D 23/02* | (2006.01) |
| *F25D 25/02* | (2006.01) |
| *F25D 25/04* | (2006.01) |

(52) U.S. Cl.
CPC ......... *B65G 47/905* (2013.01); *B65G 47/912* (2013.01); *F25D 3/10* (2013.01); *F25D 23/02* (2013.01); *F25D 25/027* (2013.01); *F25D 25/04* (2013.01)

(58) Field of Classification Search
CPC .......... F25D 3/10; F25D 23/02; F25D 25/027; F25D 25/04
USPC ...................................................... 435/307.1
See application file for complete search history.

(56) References Cited

U.S. PATENT DOCUMENTS

| | | | |
|---|---|---|---|
| 2013/0014528 A1 | | 1/2013 | Stabacinskiene et al. |
| 2013/0232998 A1 | | 9/2013 | Ward et al. |
| 2015/0204598 A1 | * | 7/2015 | Affleck .................. A01N 1/145 |
| 2015/0289500 A1 | | 10/2015 | Fuhr et al. |
| 2017/0030626 A1 | | 2/2017 | Closs et al. |
| 2018/0306493 A1 | | 10/2018 | James |

FOREIGN PATENT DOCUMENTS

| | | | | |
|---|---|---|---|---|
| CN | 105857941 A | | 8/2016 | |
| CN | 106395223 A | * | 2/2017 | ............... B65G 1/04 |
| CN | 107624751 A | | 1/2018 | |
| CN | 108557453 A | | 9/2018 | |
| CN | 109292448 A | | 2/2019 | |
| CN | 109335325 A | | 2/2019 | |
| CN | 208647604 U | | 3/2019 | |
| CN | 209023490 U | | 6/2019 | |
| CN | 209023778 U | | 6/2019 | |
| CN | 210094466 U | | 2/2020 | |
| CN | 211854564 U | | 11/2020 | |
| JP | 2016501880 A | | 1/2016 | |
| JP | 2017508984 A | | 3/2017 | |

OTHER PUBLICATIONS

Office Action mailed Aug. 8, 2023, in corresponding Japanese application No. 2022-549838, 14 pages.
Office Action mailed Sep. 29, 2023, in corresponding Chinese application No. 202010124341.5 (with concise English description), 10 pages.
Extended European Search Report mailed Mar. 1, 2024, issued in corresponding European Application No. 20921049, filed Jul. 14, 2020, 9 pages.
International Search Report mailed Nov. 11, 2020, issued in corresponding International Application No. PCT/CN2020/101758, filed Jul. 14, 2020, 6 pages.
Written Opinion mailed Nov. 12, 2020, issued in corresponding International Application No. PCT/CN2020/101758, filed Jul. 14, 2020, 7 pages.

* cited by examiner

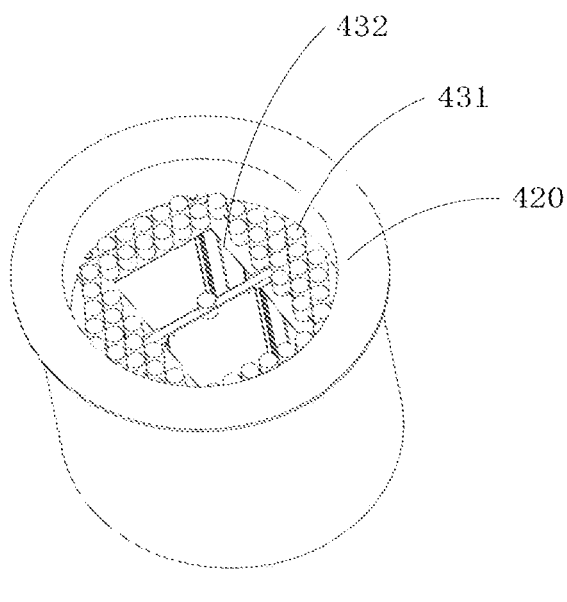

FIG. 15

| Store biospecimen | Retrieve biospecimen |
|---|---|
| Select the storage device | Select the storage device |
| Place a transferring tank storing the biospecimen into the operating device | Place an empty transferring tank into the operating device |
| Assemble the operation device to the selected storage device | assemble the operation device to the selected storage device |
| Store the biospecimen in the storage device through the operating device | Retrieve the biospecimen in the storage device and place it in the staging tank through the operating device, and take the staging tank out of the operation device |
| Disassemble the operation device from the selected storage device and seal the selected storage device | Disassemble the operation device from the selected storage device and seal the selected storage device |

FIG.16

CRYOGENIC STORAGE AND RETRIEVAL APPARATUS AND CRYOGENIC STORAGE AND RETRIEVAL METHOD

CROSS-REFERENCE TO RELATED DISCLOSURE

This application is a National Stage of International Application No. PCT/CN2020/101758, filed Jul. 14, 2020 which claims priority benefit of Chinese patent application No. 202010124341.5, filed on Feb. 27, 2020, entitled "CRYOGENIC STORAGE AND RETRIEVAL APPARATUS AND CRYOGENIC STORAGE AND RETRIEVAL METHOD", the entire contents of the disclosures of which are incorporated herein for all purposes.

TECHNICAL FIELD

The present disclosure relates to a technical field of biospecimen storage and retrieval apparatus, in particular to a cryogenic storage and retrieval apparatus and a cryogenic storage and retrieval method.

BACKGROUND

The liquid nitrogen cryopreservation tanks are liquid nitrogen containers for storing cryovials of biospecimen and cryogenic plate racks. At present, a cryogenic shelf is usually provided in the liquid nitrogen cryopreservation tank, a storage area configured to place the cryovial and the cryogenic plate rack is provided on the cryogenic shelf The storage of the cryovial and the cryogenic plate rack are completed in the storage area. However, with increasing demand of cryopreservation, the number of the cryovial and the cryogenic plate rack is increasing, but this structure can store only a limited number of the cryovial and the cryogenic plate racks, and can not effectively expand the storage area under a condition of limited cost increase.

SUMMARY

According to some embodiments, a biospecimen storage and retrieval apparatus and a biospecimen storage and retrieval method are provided.

A biospecimen storage and retrieval apparatus includes:
a storage device forming a cryogenic environment therein configured to store a biospecimen, the biospecimen comprising a cryovial and a cryogenic shelf configured to hold the cryovial;
an operating device detachably connected to the storage device, wherein the operating device is configured to receive a staging tank configured to hold the biospecimen, and the operating device completes storage and retrieval of the biospecimen in the storage device through the staging tank; and
a sealing device configured to seal the storage device when the storage device is detached from the operating device.

A method of storing and retrieving a biospecimen using a biospecimen storage and retrieval apparatus includes:
providing the biospecimen storage and retrieval apparatus as described above;
selecting the storage device according to a storage and retrieval requirement;
placing a transferring tank configured to hold the biospecimen into the operating device;

assembling the operation device to the selected storage device;
completing the storage and retrieval of the biospecimen in the storage device through the operating device and the staging tank; and
disassemble the operation device from the selected storage device, and sealing the selected storage device.

Other features, objects and advantages of the present disclosure become obvious from the following specific description and the accompanying drawings.

BRIEF DESCRIPTION OF THE DRAWINGS

A further understanding of the properties and advantages of certain embodiments may be achieved by referring to the rest of the description and the accompanying drawings, wherein similar reference numerals are used to refer to similar components. In some cases, a sub-numeral is associated with the reference number to represent one of a plurality of similar components. When the reference numeral is referred to without describing the existing sub-numeral, it is intended to refer to all such similar components.

FIG. 15 is an enlarged perspective view of the temporary storage device shown in FIG. 14.

FIG. 16 is a flowchart of a cryogenic storage and retrieval method of an embodiment.

DETAILED DESCRIPTION OF THE EMBODIMENTS

The technical solutions in the embodiments of the disclosure will be described clearly and completely below in combination with the drawings in the embodiments of the disclosure. Obviously, the described embodiments are only part of the embodiments of the disclosure, not all of the embodiments. Based on the embodiments in the disclosure, all other embodiments obtained by those skilled in the art without making creative work fall within the protection scope of the disclosure.

The following detailed description shows some exemplary embodiments in more detail to enable those skilled in the art to practice such embodiments. The described embodiments are provided for illustrative purposes only and are not intended to limit the scope of the present disclosure.

In the following description, for purposes of explanation, many specific details are set forth in order to provide a thorough understanding of the described embodiments. However, it will be obvious to those skilled in the art that other embodiments of the present disclosure may be implemented without some of these specific details. In other examples, certain structures and devices are shown in block diagram form. Several embodiments are described here, and although various features are attributed to different embodiments, it should be understood that features described with respect to one embodiment may also be combined with other embodiments. However, for the same reason, one or more features of any described embodiment should not be considered essential to each embodiment of the disclosure, as other embodiments of the disclosure may omit these features.

Unless otherwise specified, all numbers used herein to refer to quantities, dimensions, etc. used are understood to be modified by the term "about" in all instances. In this disclosure, the use of the singular includes the plural, and unless otherwise expressly stated, the use of the terms "and" and "or" means "and/or". Moreover, the use of the term "including" and other forms, such as "including" and "containing", should be considered non-exclusive. In addition, unless otherwise specified, terms such as "element" or "component" cover elements and components including one unit and elements and components including more than one unit.

Figure 1:
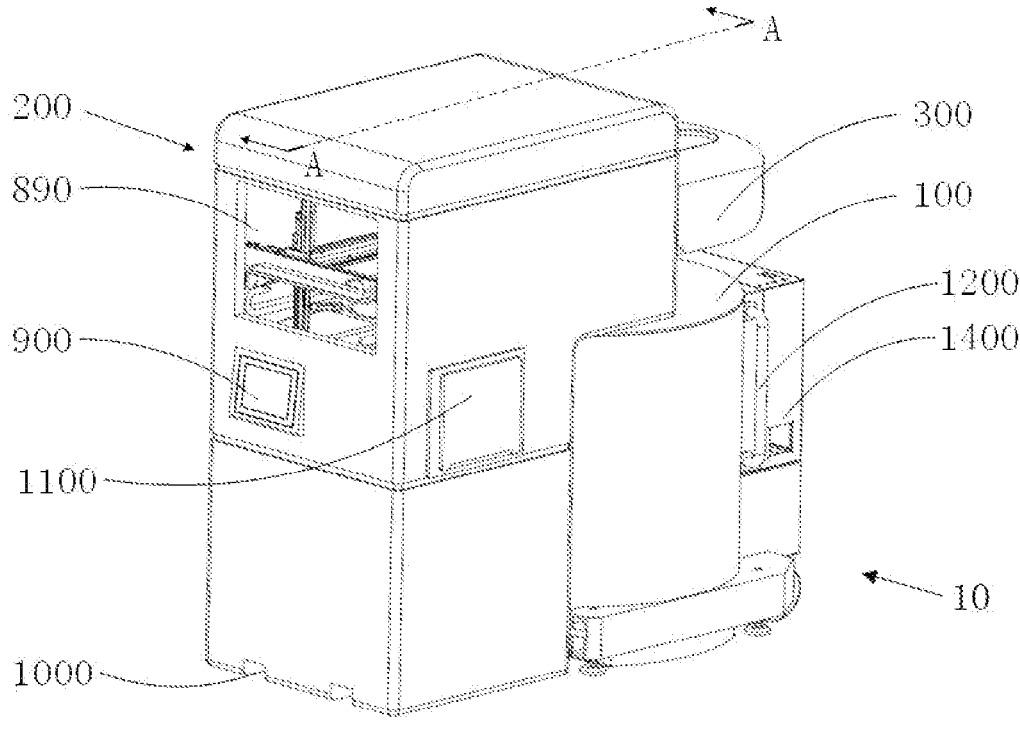
FIG. 1 is a perspective view of a cryogenic storage and retrieval apparatus according to an embodiment.
Figures 13, 14:
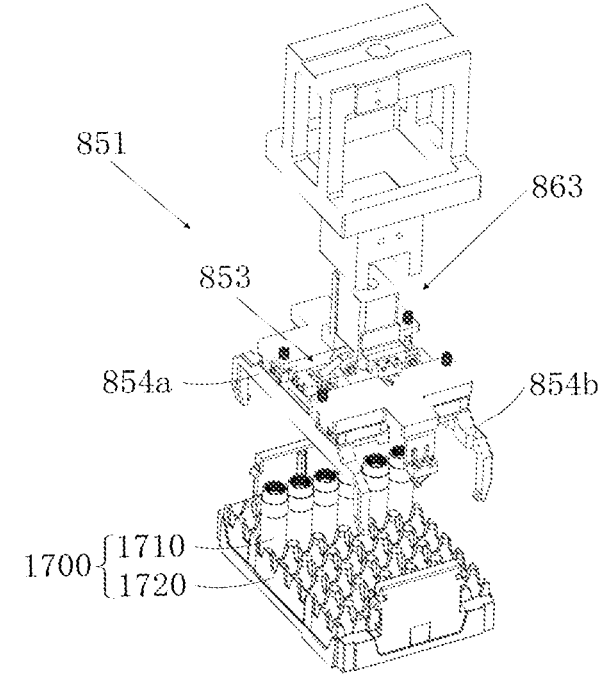
FIG. 13 is an exploded view of the gripper assembly of an embodiment.
FIG. 14 is an exploded view of a temporary storage device of an embodiment.

FIG. 1 is a perspective view of a cryogenic storage and retrieval apparatus 10 according to an embodiment. A biospecimen 1700 is shown in FIG. 13. The cryogenic storage and retrieval apparatus 10 includes a storage device 100, an operating device 200, and a sealing device 300. An interior of the storage device 100 is a cryogenic environment, and the storage device 100 is detachably connected to the operating device 200. The biospecimen 1700 is stored in the storage device 100. The operating device 200 is configured to receive a staging tank (not shown) configured to hold the biospecimen 1700, and complete the storage and retrieval of the biospecimen 1700 in the storage device 100 through the staging tank. Specifically, the operating device 200 can take out the biospecimen 1700 to be stored in the staging tank and store it in the storage device 100. The operating device 200 can also take out the biospecimen 1700 to be taken out of the storage device 100 and place it in the staging tank. When the storage device 100 is detached from the operating device 200, the sealing device 300 seals the storage device 100. The biospecimen 1700 includes cryovials 1710 configured to store samples and a cryogenic shelf 1720 configured to hold the cryovials 1710. It should be understood that at least one cryovial 1710 is held on the cryogenic shelf 1720. When the number of the cryovial 1710 to be stored reaches a certain value, it can be stored in batches through the cryogenic shelf 1720.

Specifically, a working principle of the cryogenic storage and retrieval apparatus 10 is as follows: when a control system receives an information that the biospecimen 1700 needs to be stored in the storage device 100, the staging tank containing the biospecimen 1700 to be stored is placed into the operating device 200, and the sealing device 300 corresponding to the storage device 100 with an empty storage position is opened, the operation device 200 and the storage device 100 are assembled. Then, the biospecimen 1700 to be stored in the staging tank is extracted through the operation device 200, and the extracted biospecimen 1700 to be stored is stored in the storage device 100 to complete the storage of the biospecimen 1700 to be stored. On the contrary, when the control system receives an information that the biospecimen 1700 needs to be taken out from the storage device 100, an empty staging tank is placed into the operating device 200, and the storage device 100 storing the required biospecimen 1700 is selected, and the sealing device 300 corresponding to the selected storage device 100 is opened, the operation device 200 and the selected storage device 100 are assembled. Then the required biospecimen 1700 is taken out from the selected storage device 100 through the operating device 200, the taken biospecimen 1700 is placed into the staging tank, and the staging tank containing the biospecimen 1700 is taken out of the operating device 200 to complete the retrieval of the required biospecimen 1700.

In one embodiment, the sample stored in the biospecimen 1700 may be a biological cell.

In one embodiment, an interior of the storage device 100 is a cryogenic environment. In one embodiment, the cryogenic environment is a liquid nitrogen atmosphere.

In the cryogenic storage and retrieval apparatus 10, the storage device 100 is detachably connected to the operating device 200, and the storage device 100 is sealed through the sealing device 300. The apparatus can perform a flexible one-to-many cooperation between the operation device 200 and the storage device 100 under the premise of ensuring the storage effect of the storage device 100. That is, it only needs to increase a storage space of the biospecimens by adding the storage device 100, and perform the effective expansion of the storage device with limited cost increase.

Figure 2:
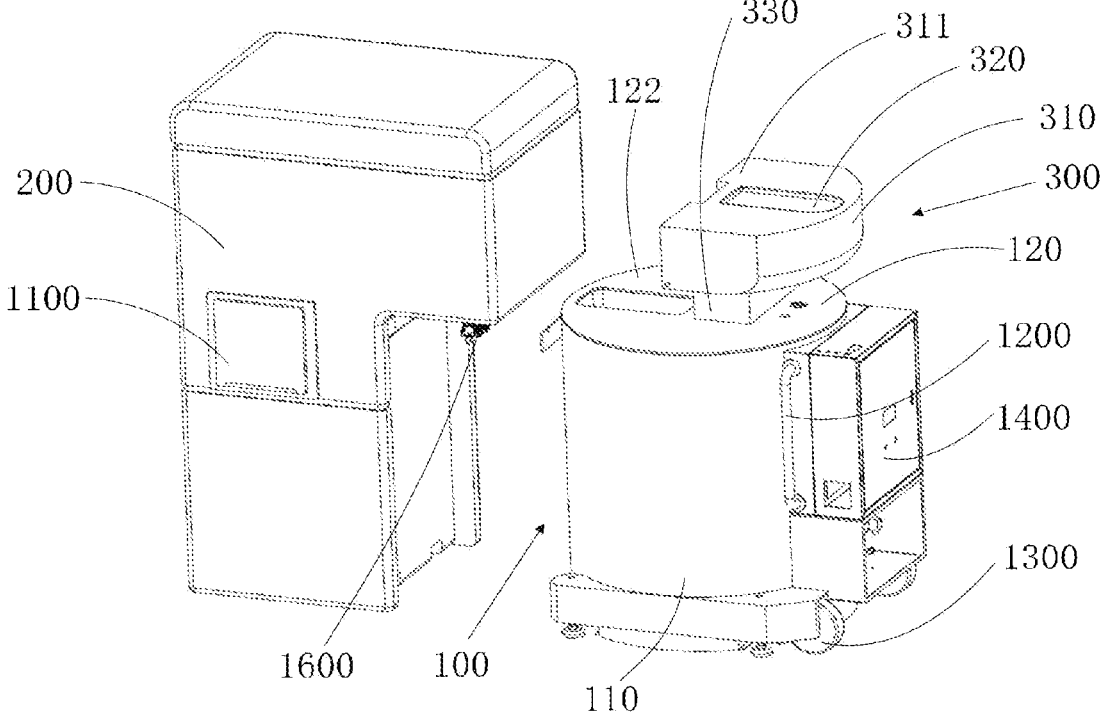
FIG. 2 is an exploded view of the cryogenic storage and retrieval apparatus shown in FIG. 1.

In one embodiment, in order to improve a degree of automation in the assembly process of the storage device 100 and the operating device 200, the operating device 200 of the cryogenic storage and retrieval apparatus 10 is further provided with a moving device (not shown) and a quick connect device 1600, as shown in FIG. 2. The moving device is configured to drive the operating device 200 to a preset position corresponding to the storage device 100. The quick connect device 1600 is configured to assemble the operating device 200 and the storage device 100. It should be understood that the preset position may be a preset position of the operating device 200 when the operating device 200 is assembled to the storage device 100.

Specifically, in one embodiment, the moving device may be a mobile robot.

Specifically, in one embodiment, the quick connect device 1600 is a buckle structure. The operating device 200 is locked to the storage device 100 through the buckle structure.

Figure 4:
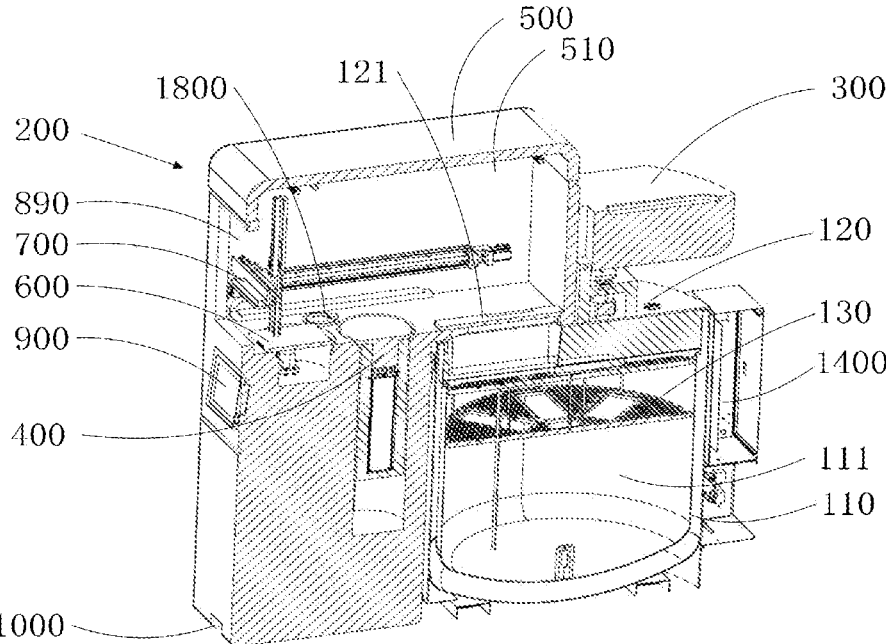
FIG. 4 is a sectional view taken along a line A-A in FIG. 1.
Figure 5:
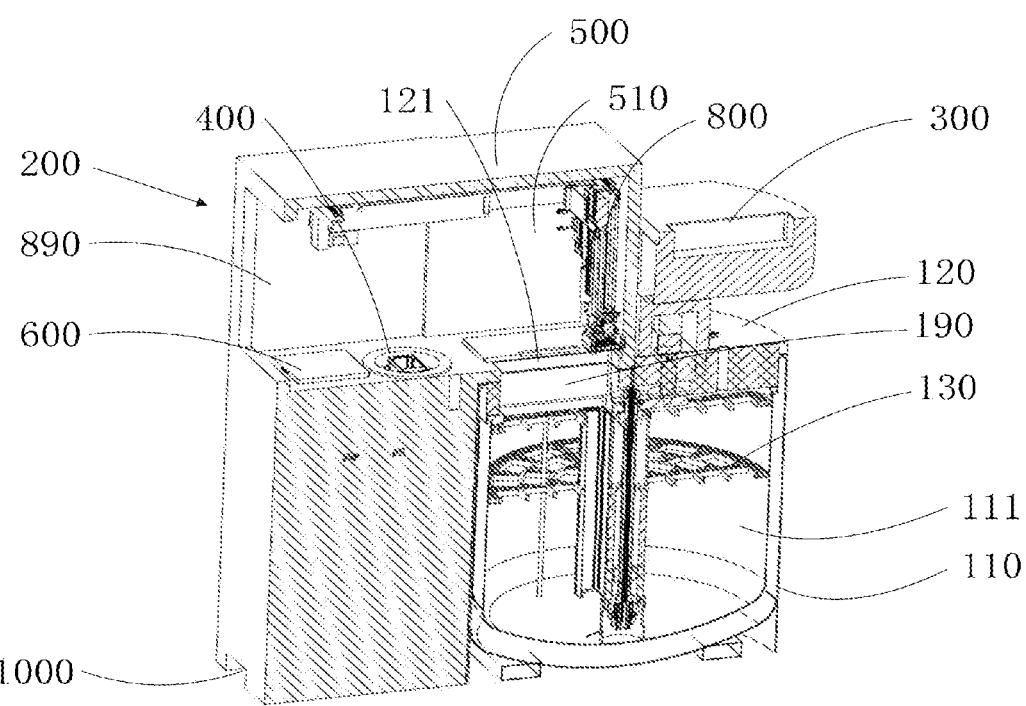
FIG. 5 is a sectional view of the cryogenic storage and retrieval apparatus shown in FIG. 1 viewed in another aspect.

In one embodiment, as shown in FIG. 1, FIG. 4 and FIG. 5, the operating device 200 includes a housing 500, a transferring tank 1100, a tank opening mechanism 700, and a grabbing mechanism 800. The housing 500 forms a sealed operating chamber 510. The tank opening mechanism 700, the grabbing mechanism 800, and the transferring tank 1100 are provided inside the operating chamber 510. The transferring tank 1100 is configured to transfer the staging tank to the operating chamber 510. The tank opening mechanism 700 is configured to open the transferring tank 1100 and the staging tank from an inside of the operating chamber 510. The grabbing mechanism 800 is configured to grip the biospecimen 1700. It should be understood that the biospecimen 1700 gripped by the grabbing mechanism 800 can be the biospecimen to be stored in the staging tank or the biospecimen to be taken out from the storage device 100. The staging tank enters the operating chamber 510 from an outside of the operation device 200 through a side door (not labeled) of the transferring tank 1100. The tank opening mechanism 700 opens a top cover of the transferring tank 1100 and a top cover of the staging tank from an inside of the operating chamber 510, and then the grabbing mechanism 800 grabs the biospecimen 1700 to be stored in the staging tank and stores it in the storage device 100, or grabs the required biospecimen 1700 from the storage device 100 and places it into the staging tank.

In one embodiment, the tank opening mechanism 700 places the top cover removed from the staging tank on a transfer groove 600.

In one embodiment, the transferring tank 1100 is provided with a dust removal and dehumidification device configured to dedust and dehumidify the staging tank in the transferring tank 1100.

In the cryogenic storage and retrieval apparatus 10, the housing of the operating device 200 forms the sealed operating chamber 510, and the transferring tank 1100, the tank opening mechanism 700 and the grabbing mechanism 800 are all located inside the operating chamber 510. Therefore, the transferring tank 1100 and the staging tank can be opened through the tank opening mechanism 700 in the operating device 200 without manual intervention, and the biospecimen can be stored and retrieved through the grabbing mechanism 800. An automation of the operation is implemented, a risk of biospecimens exposed to room temperature is reduced, an activity of biospecimens is improved, and a potential safety hazards of access is reduced.

Figure 10:
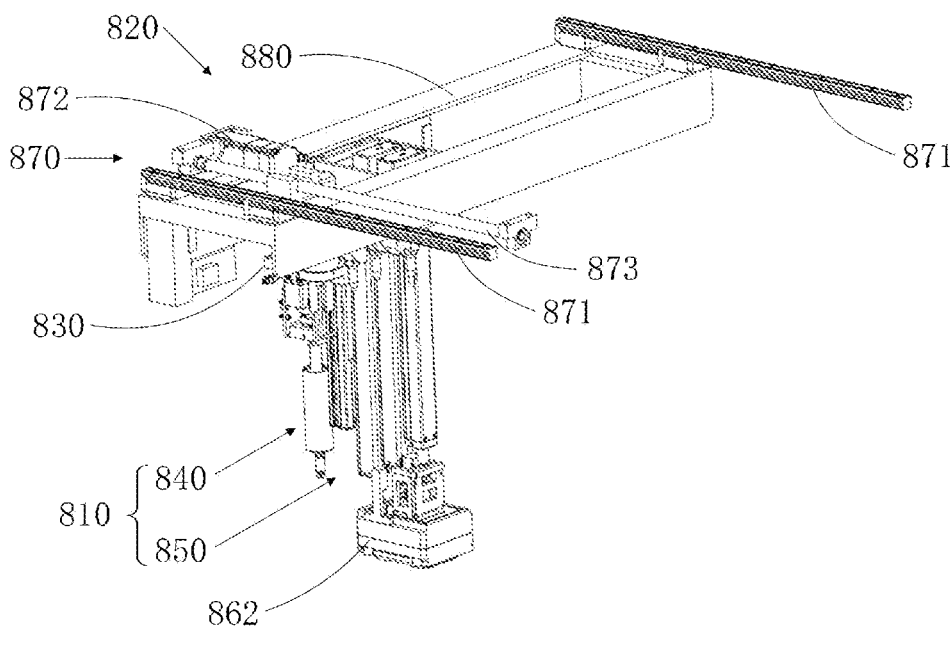
FIG. 10 is an enlarged perspective view of a biospecimen grabbing assembly in FIG. 9.

In one embodiment, according to FIG. 10, the grabbing mechanism 800 includes a biospecimen grabbing assembly 810 and a grabbing moving assembly 820. The biospecimen grabbing assembly 810 is configured to grab the biospecimen 1700. The grabbing moving assembly 820 is configured to drive the biospecimen grabbing assembly 810 to move. Specifically, the grabbing moving assembly 820 is configured to drive the biospecimen grabbing assembly 810 to move above the transferring tank or the storage device 100, so as to realize the removal and storage of the biospecimen 1700.

In one embodiment, the grabbing moving assembly 820 includes an X-axis module 870, a Y-axis guide rail 830, and a Y-axis fixing plate 880. The biospecimen grabbing assembly 810 is slidably connected to the Y-axis guide rail 830, and the X-axis module 870 is slidably connected to the Y-axis guide rail 830 through the Y-axis fixing plate 880. The biospecimen grabbing assembly 810 is configured to grab the biospecimen 1700. The X-axis module 870 is configured to guide the biospecimen grabbing assembly 810 to slide along an X-axis. The Y-axis guide rail 830 is configured to guide the biospecimen grabbing assembly 810 to slide along a Y-axis.

In one embodiment, as shown in FIG. 10, the X-axis module 870 includes an X-axis guide rail 871, an X-axis drive motor 872, and a gripping X-axis lead screw 873.

Further, in order to facilitate a monitoring of related operations in the operating device, the operating device 200 of the cryogenic storage and retrieval apparatus 10 is further provided with an observation window 890. The related operations in the operating chamber 510 can be monitored through the observation window 890. It should be understood that the related operations can be the opening of the transferring tank 1100, the opening of the staging tank, the storage and retrieval of the biospecimen 1700, and a supplement of nitrogen.

The X-axis module 870 is connected to the Y-axis guide rail 830 through the Y-axis fixing plate 880, an individual control of the X-axis and Y-axis of the biospecimen grabbing assembly 810 is achieved, a linkage between the X-axis and Y-axis is avoided during the movement of the biospecimen grabbing assembly 810, a movement accuracy of the biospecimen grabbing assembly 810 is improved, and further a flexible grabbing of biospecimens at any position in the operating chamber 510 and the storage device 100 is achieved.

Figure 11:
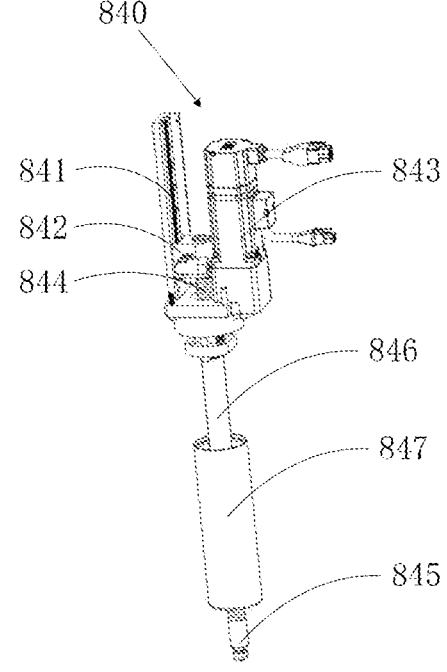
FIG. 11 is an enlarged perspective view of a suction head assembly in FIG. 10.

In one embodiment, according to FIG. 11, the biospecimen grabbing assembly 810 includes a suction head assembly 840 configured to suck the cryovial 1710. The suction head assembly 840 includes a suction head guide rail seat 841, a negative pressure joint 842, a suction head motor 843, a suction head lead screw 844, and a suction head component 845. The suction head guide rail seat 841 is slidably connected to the Y-axis guide rail 830. The suction head component 845 is provided on a driving end of the suction head lead screw 844. The suction head motor 843 is configured to drive the suction head lead screw 844 to drive the suction head component 845 to slide along the suction head guide rail seat 841 to adjust a position of the suction head component 845 in the Z-axis direction. When the suction head component 845 moves to the inside of the staging tank or above the cryovial 1710 in the storage device 100, the negative pressure connector 842 is configured to generate negative pressure, the suction head component 845 sucks the cryovial 1710 under the negative pressure to grasp the cryovial 1710.

Further, in order to ensure the activity of the sample in the cryovial 1710 during grasping and moving, the suction head assembly 840 further includes a cold guide tube 846 and a liquid storage tube 847. The cold guide tube 846 is sleeved in the liquid storage tube 847. The suction head lead screw 844 is sleeved in the cold guide tube 846, and a sealed cavity formed between the liquid storage tube 847 and the cold guide tube 846 is filled with protective gas to provide the cryogenic environment. After the suction head part 845 sucks the cryovial 1710, the suction head motor 843 reverses, the suction head part 845 is driven by the suction head lead screw 844 to move toward the cooling tube 846 until the cryovial 1710 enters an interior of the cold guide tube 846.

In the cryogenic storage and retrieval apparatus 10, the cryovial 1710 is grabbed through the suction head assembly 840 of the biospecimen grabbing assembly 810, the storage of a variety of biospecimens is achieve, and the use range of the cryogenic storage and retrieval apparatus 10 is expanded. At the same time, the cold guide tube 846 and the liquid storage cylinder 847 are provided on the suction head assembly 840 to realize a whole cold chain in a process of storage and retrieval of the cryovial 1710, thus avoiding a phenomenon that the temperature of the biospecimen is rose rapidly due to exposure to a normal temperature environment during the transfer of the cryovial 1710, which reduces the activity of the biospecimen.

Figure 12:
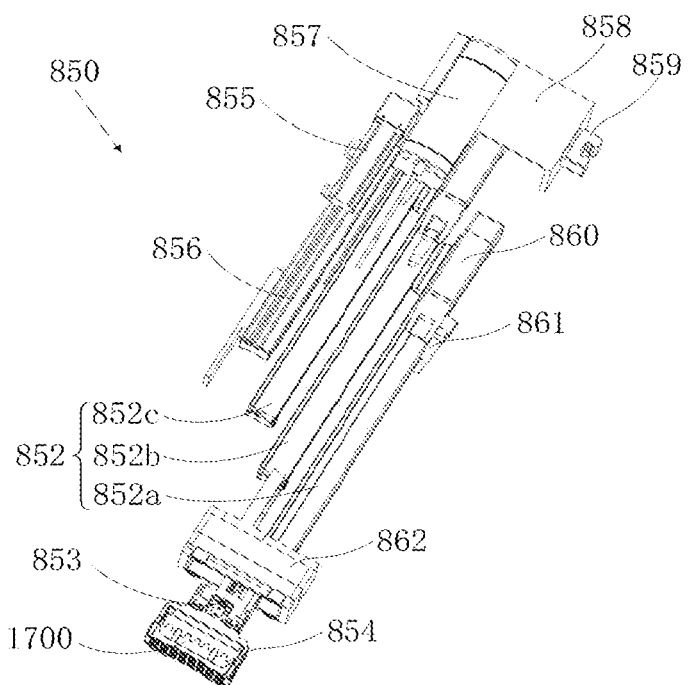
FIG. 12 is a perspective view of a gripper assembly in FIG. 10.

In one embodiment, according to FIG. 12 and FIG. 13, the biospecimen grabbing assembly 810 can further include a gripper structure 851 configured to suck the cryogenic shelf 1720, a drive motor 855, and a drive guide rail 856. The gripper structure 851 includes a gripping arm 852, a transmission component 853, and a gripper component 854. The transmission component 853 is located at one end of the gripping arm 852. The transmission component 853 is provided with an input end configured to receive a driving force and an output end configured to output the converted driving force, and the gripper component 854 is provided on the output end. The transmission component 853 converts the driving force received through the input end along an extension direction of the gripping arm 852 into a driving force perpendicular to the extension direction of the gripping arm 852. The gripper component 854 includes a first jaw 854*a* and a second jaw 854*b*, and a clamping space configured to grip the biospecimen 1700 is provided between the first jaw 854*a* and the second jaw 854*b*. The first jaw 854*a* and the second jaw 854*b* are driven by the transmission component 853 to move in a direction perpendicular to the extension direction of the gripping arm 852, and movement directions of the first jaw 854*a* and the second clamping jaw 854*b* are opposite. The movement directions are opposite, which means that the movement of the first jaw 854*a* is opposite to the movement of the second jaw 854*b* in a preset direction. It should be understood that a result of moving in the opposite directions can be that the first jaw 854*a* approaches the second jaw 854*b*, that is, the clamping space is reduced, or the first jaw 854*a* is away from the second jaw 854*b*, that is, the clamping space is increased. The gripper structure 851 is configured to grasp the sample 1700. The gripper structure 851 is driven by the drive motor 855 to move along the drive guide rail 856, so as to adjust positions of the gripper structure 851 and the biospecimen 1700 in a Z-axis direction.

In order to improve the automation of a gripper assembly 850, in one embodiment, the input end of the transmission component 853 is provided with a driving member 863. The driving member 863 is configured to input the driving force along the extension direction of the gripping arm 852 to the transmission component 853.

The gripper assembly 850 of the cryogenic storage and retrieval apparatus 10 drives the transmission component 853 and the gripper component 854 to move above the biospecimen 1700 through the gripping arm 852, and applies the driving force along the extension direction of the gripping arm 852 to the transmission component 853. Under an action of the transmission component 853, the driving force along the extension direction of the gripping arm 852 is converted into a driving force perpendicular to the extension direction of the gripping arm 852, and then the first jaw 854*a* and the second jaw 854*b* in the gripper component 854 are driven to move along the extension direction perpendicular to the gripping arm 852 until a first plane of the first jaw 854*a* and a second plane of the second jaw 854*b* abut against a surface of an object to be clamped to clamp the biospecimen 1700, then the transmission of biospecimen 1700 is performed. The gripper assembly 850 subtly converts the driving force along the extension direction of the gripping arm 852 into the driving force perpendicular to the extension direction of the gripping arm 852 through the transmission component 853, realizing the gripper component 854 to clamp the biospecimen 1700. Therefore, a size of the clamping mechanism in the direction perpendicular to the extension direction of the gripping arm 852 can be reduced as much as possible, that is, a compact design of the clamping mechanism can be realized. At the same time, the force perpendicular to the extension direction of the gripping arm 852 is applied to the biospecimen 1700 through the transmission component 853, a stability of the gripper assembly 850 is improved during a clamping process.

Further, in order to protect the biospecimen 1700 during the transfer of the biospecimen 1700, a thermal insulation cover 862 is further provided on the outside of the gripper component 854. The thermal insulation cover 862 is filled with protective gas to provide the cryogenic environment, so that the gripper component 854 and the biospecimen 1700 held by the gripper component 854 are always in the cryogenic environment, thus realizing the whole cold chain in the process of storage and retrieval of the cryogenic shelf 1720, and avoiding the phenomenon that the temperature of the biospecimen is rose rapidly due to exposure to a normal temperature environment during the transfer of the cryovial 1710, which reduces the activity of the biospecimen. The activity of samples in biospecimen 1700 is ensured.

Further, in order to protect the biospecimen 1700 during the transfer of the biospecimen 1700, the gripper assembly 850 further includes a gas compensation member 857, and protective gas is stored in the gas compensation member 857. The gas compensation member 857 can compensate the protective gas in the thermal insulation cover 862 to a preset concentration in real time, so as to ensure that a temperature of the thermal insulation cover 862 is always lower than a preset temperature, so that the biospecimen 1700 held by the gripper component 854 and the gripper component 854 are always in a cryogenic environment, the activity of the sample in the biospecimen 1700 is further ensured.

Further, in order to extend a working range of the gripper assembly 850, the gripping arm 852 includes a first gripping arm 852*a*, a second gripping arm 852*b*, and a third gripping arm 852*c* that can slide relatively. The first gripping arm 852*a*, the second gripping arm 852*b* and the third gripping arm 852*c* are respectively driven by corresponding drive electric cylinder 860 to realize a three-level operation of the gripper assembly 850, the operation range of the gripper assembly 850 is increased, a utilization rate of the storage device 100 is improved, and a stability of the operation during the placement of the biospecimen 1700 is also improved.

Further, the gripper assembly 850 is fixedly connected to the Y-axis guide rail 830 in the Z-axis direction through a Z-axis fixing seat 858, and is slidably connected to the Y-axis guide rail 830 in the Y-axis direction through a chute 859.

Further, the gripper assembly 850 further includes a position sensor 861 provided on the gripping arm 852. The position sensor 861 is configured to realize an accurate positioning of the gripping arm 852, that is, to achieve precise positioning of the gripping arm 852, that is, to achieve precise positioning of the biospecimen 1700 held by the gripper component 854, a supervision and control of the movement of the gripper assembly is improved.

Figure 7:
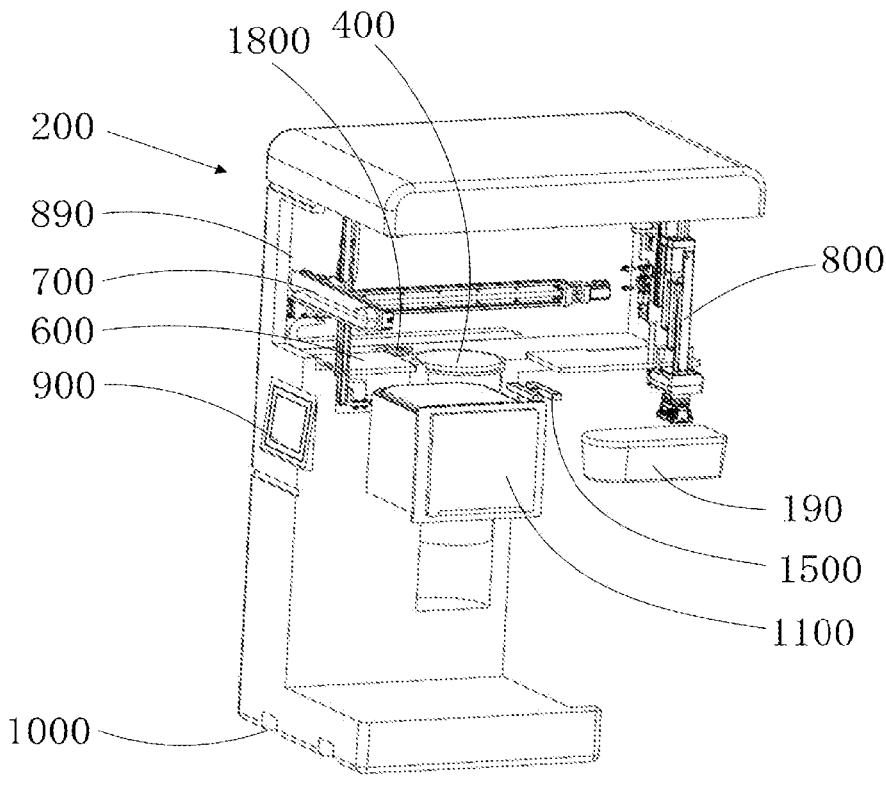
FIG. 7 is a perspective view of an operating device of an embodiment.
Figure 8:
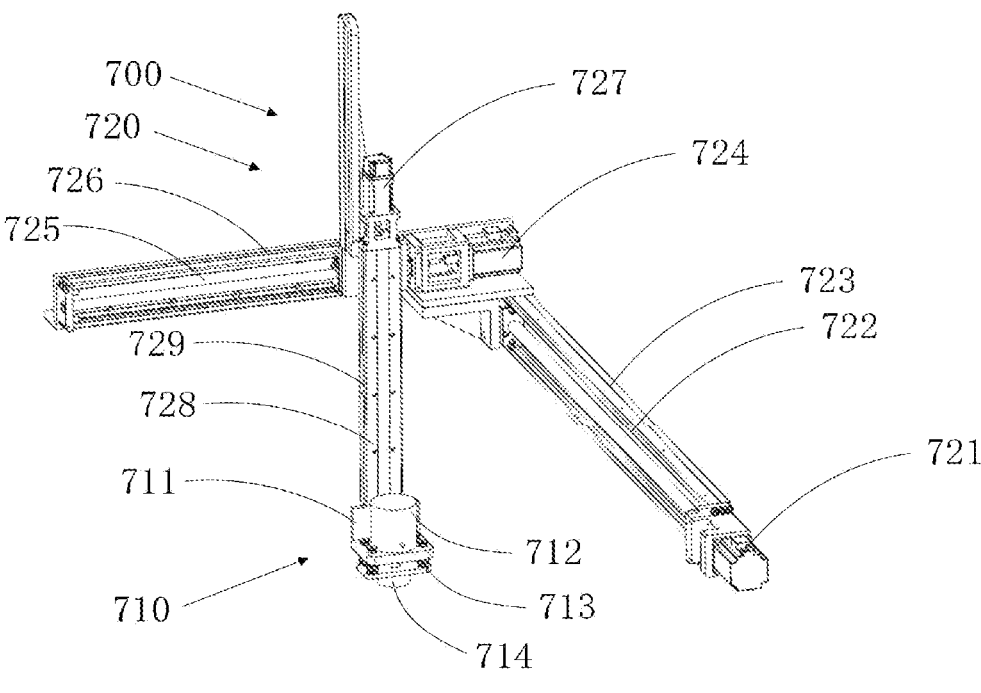
FIG. 8 is a perspective view of a tank opening mechanism in FIG. 7.

In one embodiment, as shown in FIGS. 7 and 8, the tank opening mechanism 700 includes a first tank opening assembly 710 and a tank opening moving assembly 720. The first tank opening assembly 710 is configured to open the transferring tank 1100 and the staging tank. The tank opening moving assembly 720 is configured to drive the first tank opening assembly 710 to move above the staging tank.

In one embodiment, the first tank opening assembly 710 can also open other tanks besides the transferring tank 1100 and the staging tank in the operating chamber 510.

In the cryogenic storage and retrieval apparatus 10, the first tank opening assembly 710 is moved above the staging tank through the tank opening moving assembly 720, and the transferring tank 1100 and the staging tank are opened through the first tank opening assembly 710, so as to realize full automation of the operating device 200. Therefore, it is possible to effectively prevent external air from entering the operating chamber 510, avoid damage to the samples in the biospecimen 1700 caused by a room temperature environment, and ensure the activity of the samples during the storage and retrieval process.

In one embodiment, as shown in FIGS. 7 and 8, the first tank opening assembly 710 includes a tank opening fixing seat 711, a telescopic electromagnet 712, a spring 713, and an electromagnet 714. The tank opening fixing seat 711 is provided on a driving end of the tank opening moving assembly 720. The electromagnet 714 is fixedly connected to the tank opening fixing seat 711. The telescopic electromagnet 712 is slidably connected to the tank opening moving assembly 720. The spring 713 is provided between the telescopic electromagnet 712 and the electromagnet 714. The first tank opening assembly 710 drives the telescopic electromagnet 712 through an elastic deformation of the spring 713, and then pushes the cover of the transferring tank 1100 or the staging tank to move upward to open the transferring tank 1100 or the staging tank.

In one embodiment, as shown in FIG. 8, the tank opening moving assembly 720 includes an X-axis motor 721, an X-axis screw 722, an X-axis fixing seat 723, a Y-axis motor 724, a Y-axis screw 725, a Y-axis movable plate 726, a Z-axis motor 727, a Z-axis screw 728, and a Z-axis lifting plate 729. The first tank opening assembly 710 is provided on the z-axis lifting plate 729. The tank opening moving assembly 720 is configured to realize the movement of the first tank opening assembly 710 on the X axis, Y axis and Z axis respectively.

Figure 9:
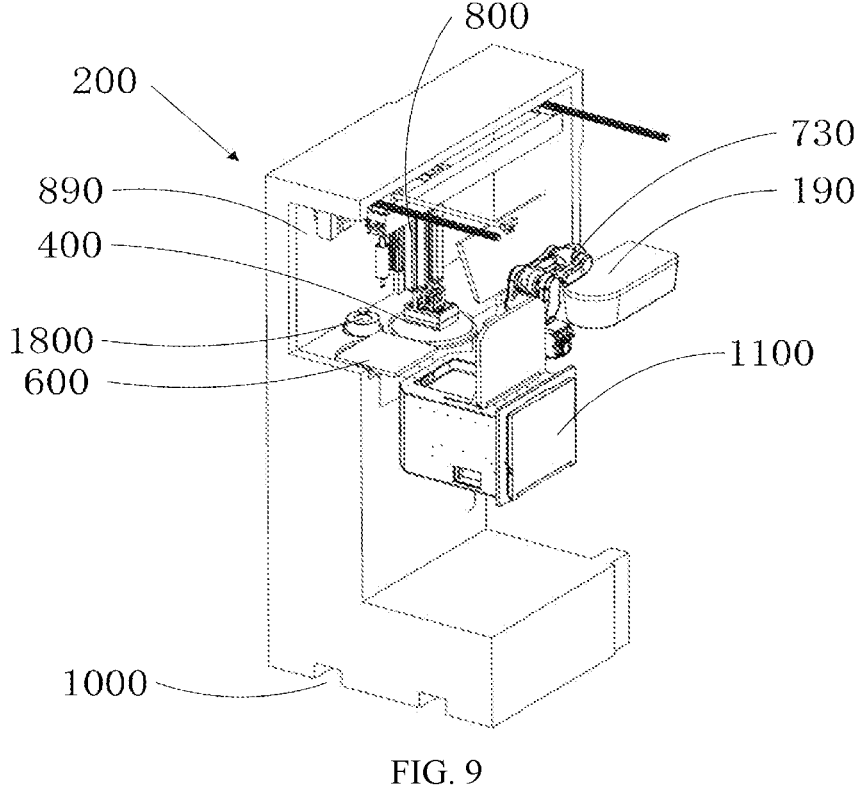
FIG. 9 is a perspective view of an operating device of an embodiment.

In another embodiment, as shown in FIGS. 8 and 9, the tank opening mechanism 700 includes a second tank opening assembly 730 and the tank opening moving assembly 720. The second tank opening assembly 730 may be in any other form of cover opening structure.

In the cryogenic storage and retrieval apparatus 10, the transferring tank 1100 and the staging tank are opened through the first tank opening assembly 710, so as to realize a full automation in the operation of storage and retrieval of the biospecimen 1700. Due to the simple structure and good stability of the first tank opening assembly 710, an operability and an applicability of the tank opening mechanism 700 are improved.

In one embodiment, in order to facilitate the movement of the operating device 200, in one embodiment, a bottom of the operating device 200 is further provided with a wheel assembly (not shown), which improves the operability of disassembly of the cryogenic storage and retrieval apparatus 10 and facilitates the movement of the operating device 200.

In one embodiment, in order to realize the movement of the operating device 200, in another embodiment, as shown in FIG. 1, the bottom of the operating device 200 is further provided with a forklift hole 1000. When the operating device 200 needs to be moved, a cooperation of a forklift and the forklift hole 1000 is used to complete a loading of the operating device 200, so as to realize the movement of the operating device 200 and improve the operability of disassembly of the cryogenic storage and retrieval apparatus 10.

In order to further improve a management of the biospecimen 1700, as shown in FIG. 7, in one embodiment, a board scanning decoder 1500 is provided inside the operating chamber 510, and a quick response code is provided at a bottom of the cryovial 1710 and the cryogenic shelf 1720. The grabbing mechanism 800 grabs the cryovial 1710 and the cryogenic shelf 1720 and moves them above the board scanning decoder 1500. The quick response code at the bottom of the cryovial 1710 and the cryogenic shelf 1720 is read by the board scanning decoder 1500, and corresponding storage position of the cryovial 1710 and the cryogenic shelf 1720 in the storage device 100 is recorded.

Further, in one embodiment, one side of the operating device 200 is further provided with a display screen 900. The display screen 900 is configured to control the tank opening mechanism 700, the grabbing mechanism 800 and the transferring tank 1100 in the operating chamber 510 to complete relevant operations. The display screen 900 can include a programmable logic controller (PLC) and a control system. The operation process in the operation device 200 is controlled by the display screen 900, an automation degree of the cryogenic storage and retrieval apparatus 10 is improved, the protection of the biospecimens during the storage and retrieval process is improved, and a storage effect of the biospecimens is optimized.

In one embodiment, as shown in FIGS. 4 and 5, the storage device 100 includes a tank body 110, a tank cover 120, a storage mechanism 130, and an access cover 190. The tank cover 120 is provided above the tank body 110, and the sealed storage chamber 111 is formed between the tank cover 120 and the tank body 110. The tank cover 120 is provided with an access port 121. The storage mechanism 130 is rotatably supported in the storage chamber 111. The storage mechanism 130 is configured to realize the placement of the biospecimen 1700. The access cover 190 and the access port 121 cooperatively seal the storage device 100.

In order to improve the storage effect of the storage device 100, in one embodiment, the tank body 110 has a double shell structure, and the protective gas configured to provide the cryogenic environment is filled between two shells. Therefore, the cryogenic environment in the storage chamber 111 can be effectively ensured, the storage effect of the storage device 100 on the biospecimen 1700 can be improved.

The cryogenic storage and retrieval apparatus 10 can store the biospecimen 1700 through the storage mechanism 130. Since the storage chamber 111 is filled with the protective gas that provides the cryogenic environment, the activity of the samples in the biospecimen 1700 can be ensured and the storage effect of the biospecimen can be ensured.

Figure 6:
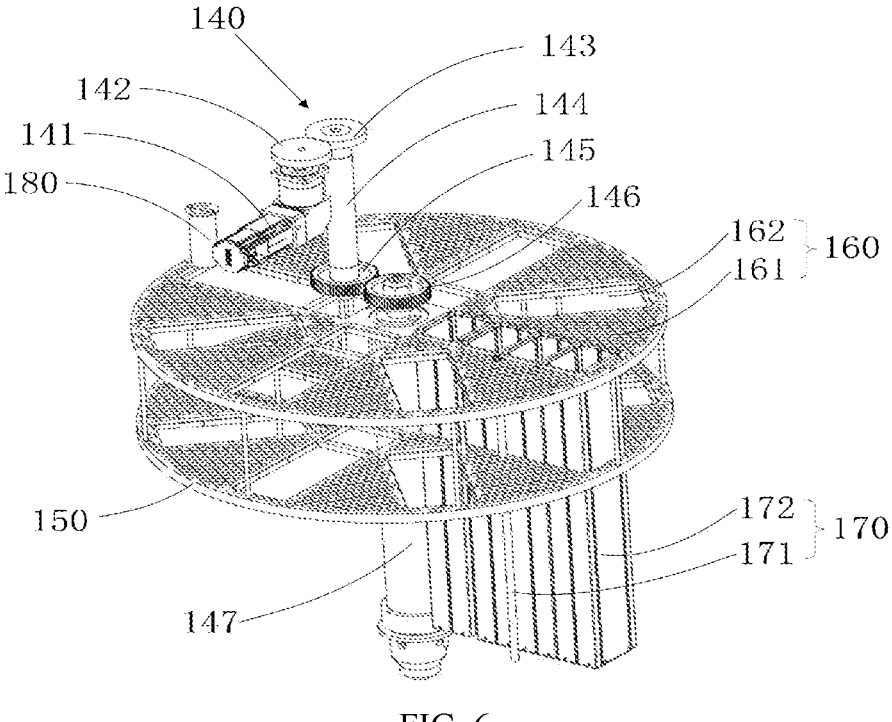
FIG. 6 is an enlarged perspective view of a storage mechanism shown in FIG. 4.

In one embodiment, as shown in FIG. 6, the storage mechanism 130 includes a rotating assembly 140, a storage rack 150, and a storage member 170. The storage member 170 is a cavity structure with a certain depth and an open top. The cavity structure is configured to place the biospecimen 1700. The storage rack 150 is provided with a storage hole 160. The storage member 170 is latched on the storage rack 150 through the storage hole 160. The storage rack 150 is provided on the rotating assembly 140. The rotating assembly 140 drives the storage member 170 to rotate at the access port 121 through the storage rack 150, so that the grabbing mechanism 800 in the operating device 200 can store the biospecimen 1700 into the storage member 170 through the access port 121 or take out the biospecimen 1700 from the storage member 170 through the access port 121.

In one embodiment, a material of the storage member 170 is an aluminum alloy.

In one embodiment, the rotating assembly 140 may be a gear set structure that drives the storage part 170 to rotate through a motor.

In one embodiment, the storage mechanism 130 is further provided with an exhaust hole 180. The exhaust hole 180 is provided in the storage device 100 to facilitate the completion of an exhaust step in the process of filling the protective gas in the storage device 100.

In one embodiment, as shown in FIG. 6, the rotating assembly 140 includes a motor 141, a first gear 142, a second gear 143, a first rotating shaft 144, a third gear 145, a fourth gear 146, and a second rotating shaft 147. The first gear 142 is fixed to a driving end of the motor 141 and engaged with the second gear 143. One end of the first rotating shaft 144 is sleeved with the second gear 143, the other end of the first rotating shaft 144 is sleeved with the third gear 145. The third gear 145 is engaged with the fourth gear 146. One end of the second rotating shaft 147 is sleeved with the fourth gear 146 and is fixed to a center of the storage rack 150. During a working process of the rotating assembly 140, the motor 141 is activated, the first gear 142 is driven to rotate by the motor 141, so as to drive the second gear 143 to rotate, the first rotating shaft 144 and the third gear 145 are driven to rotate through the second gear 143, and the fourth gear 146 and the second rotating shaft 147 are driven to rotate through the third gear 145, and finally the storage rack 150 is driven to rotate through the second rotating shaft 147. A precise control of a rotation angle can be achieved by driving the storage rack 150 to rotate through the gear set.

The storage mechanism 130 in the cryogenic storage and retrieval apparatus 10 drives the storage rack 150 to rotate through the rotating assembly 140 to realize the flexible rotation of the storage member 170. It can also complete the storage and retrieval of biospecimens at any position in the storage chamber 111 when the storage chamber 111 is large and a size of the storage hole 160 is small. While ensuring a sealing performance of the storage device 100, it improves the space utilization of the storage device 100.

Further, in order to realize the storage of the cryovial 1710 by the storage device 100, in one embodiment, as shown in FIG. 6, the storage hole 160 may be a circular aluminum tube hole 161 configured to store the cryovial 1710. The storage member 170 may be a circular limit tube 171 configured to store the cryovial 1710. A plurality of cryovials 1710 can be stacked in the circular limit tube 171.

In the cryogenic storage and retrieval apparatus 10, the circular limit tube 171 configured to receive the cryovial 1710 is latched in the circular aluminum tube hole 161 to realize the separate storage of the cryovial 1710. That is, when the number of cryovials 1710 to be stored is small and does not reach a standard number on the cryogenic shelf 1720, the cryovial 1710 can be directly stored in the circular limit tube 171. It is especially suitable for the storage of small batches of biospecimens. The effective utilization rate of the space in the storage device 100 is improved. At the same time, it is not necessary to repeatedly take out the cryogenic shelf 1720 that is not full of the cryovial 1710, so as to ensure the storage effect of biospecimens.

Further, in order to realize the storage of the cryogenic shelf 1720 by the storage device 100, in another embodiment, as shown in FIG. 6, the storage hole 160 on the storage rack 150 may be a rectangular aluminum tube hole 162 configured to store the cryogenic shelf 1720, and the storage member 170 may be a rectangular limiting tube 172 configured to store the cryogenic shelf 1720.

In the cryogenic storage and retrieval apparatus 10, the rectangular limiting tube 172 configured to receive the cryogenic shelf 1720 is latched to the rectangular aluminum tube hole 162, so as to realize the storage of the cryogenic shelf 1720. That is, the batch storage of all cryovials 1710 on the cryogenic shelf 1720 is realized, and the same batch of biospecimens or biospecimens with the same requirements can be stored or taken out at the same time. It improves the storage efficiency of biospecimens and simplifies the management of biospecimens.

In one embodiment, as shown in FIG. 6, the storage member 170 is arranged outward from the center of the storage rack 150 on the storage rack 150.

Figure 3:
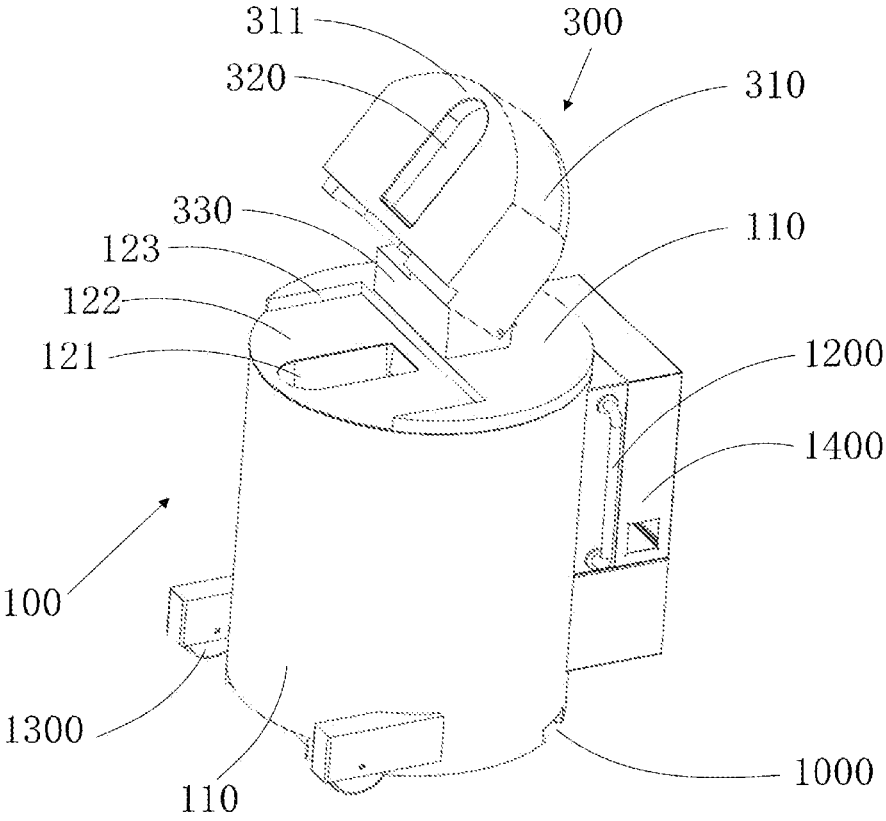
FIG. 3 is a perspective view of a storage device and a sealing device shown in FIG. 2 viewed in another aspect.

In one embodiment, as shown in FIG. 3, in order to realize the movement of the storage device 100, the side of the storage device 100 further includes an armrest 1200. When the storage device 100 needs to be moved, the storage device 100 can be moved through the armrest 1200, which improves the convenience of operation.

In one embodiment, as shown in FIG. 2 and FIG. 3, in order to realize the movement of the storage device 100, the bottom of the storage device 100 is further provided with a wheel assembly 1300. When the storage device 100 needs to be moved, the storage device 100 can be moved through the wheel assembly 1300, which facilitates the management of the storage device 100.

In one embodiment, in order to realize the movement of the storage device 100, as shown in FIG. 3, the bottom of the storage device 100 is further provided with the forklift hole 1000. When the storage device 100 needs to be moved, the cooperation of the forklift and forklift hole 1000 is used to complete the loading of the storage device 100, so as to realize the movement of the storage device 100 and a long-distance transportation of the storage device 100.

In one embodiment, as shown in FIGS. 2 and 3, the sealing device 300 includes a sealing cover 310. The sealing cover 310 is rotatably connected to the tank cover 120. The sealing cover 310 is provided with a sealing port 320 corresponding to the access port 121. When the first sealing surface 311 on the sealing cover 310 coincides with a second sealing surface 122 of the tank body 110, the sealing port 320, the access port 121 and the access cover 190 cooperatively seal the storage device 100.

The cryogenic storage and retrieval apparatus 10 can effectively prevent external air from infiltrating the storage chamber 111 through a mating surface of the access port 121 and the access cover 190 through a cooperation between the sealing port 320 of the sealing device 300 and the access cover 190 of the storage device 100. A sealing performance of the storage device 100 is improved, the cryogenic environment in the storage chamber 111 is stabilized, a consumption of the protective atmosphere for providing the cryogenic environment is reduced, a use cost is reduced, and an economic benefit is improved.

In one embodiment, as shown in FIG. 2 and FIG. 3, a top of the tank cover 120 is provided with a sealing groove 123 matching a size of the sealing cover 310. The second sealing surface 122 is located at a bottom of the sealing groove 123. When the first sealing surface 311 coincides with the second sealing surface 122, a side of the sealing groove 123 cooperates with a side of the sealing cover 310 to seal the storage device 100.

In the cryogenic storage and retrieval apparatus 10, a sealing groove 123 is provided on the top of the tank cover 120. The side of the sealing groove 123 is matched with the side of the sealing cover 310 to extend a path for external air to penetrate into the storage chamber 111, therefore it can effectively prevent external air from penetrating into the storage chamber 111 through the mating surface of the access port 121 and the access cover 190, and further improves the sealing performance of the storage device 100, further stabilizes the cryogenic environment in the storage chamber 111, reduces the consumption of the protective atmosphere for providing the cryogenic environment, reduces the use cost and improves economic efficiency.

In one embodiment, in order to realize an automatic control of the sealing device 300, in the cryogenic storage and retrieval apparatus 10, the sealing cover 310 and the tank cover 120 are rotatably connected through a rotating member 330. The rotating member 330 is provided with a rotating driving member (not shown) configured to drive the sealing cover 310 to rotate relative to the storage device 100.

In one embodiment, as shown in FIG. 7, FIG. 14 and FIG. 15, the cryogenic storage and retrieval apparatus 10 further includes a temporary storage device 400. The temporary storage device 400 is provided inside the operating chamber 510, and the temporary storage device 400 is filled with protective gas for providing a cryogenic environment. The temporary storage device 400 is configured to temporarily store the biospecimen 1700. It should be understood that the temporary storage can be the temporary storage of the biospecimen 1700 prior to the biospecimen 1700 is stored in the storage device 100 during the storage process of the biospecimen 1700, or the temporary storage of the biospecimen 1700 that needs to be moved during the removal process of the biospecimen 1700, or an advance storage of the biospecimen 1700 needs to be taken out after the biospecimen 1700 is scheduled to be taken out.

The cryogenic storage and retrieval apparatus 10 is provided with the temporary storage device 400. The biospecimen 1700 can be temporarily stored through the temporary storage device 400. Specifically, in the process of taking out biospecimens, the temporary storage device 400 can receive the biospecimens in an upper part of the same storage member 170, thus facilitating the taking out of the lower biospecimens, realizing an convenience of taking out the lower biospecimens while ensuring a protection of the biospecimens in the upper part of the same storage member 170, further improving the storage effect of biospecimens, and improving the management of the storage and retrieval of biospecimen.

In one embodiment, as shown in FIGS. 14 and 15, the temporary storage device 400 includes a temporary storage tank cover 410, a temporary storage tank body 420, and a temporary storage member 430. The temporary storage tank cover 410 and the temporary storage tank 420 form a sealed temporary storage chamber (not shown). The temporary storage chamber is in a cryogenic environment, and the temporary storage member 430 is located in the temporary storage chamber. It should be understood that the temporary storage member 430 includes a circular temporary storage member 431 configured to place the cryovial 1710 and a rectangular temporary storage member 432 configured to place the cryogenic shelf 1720. The temporary storage device 400 realizes the temporary storage of the cryovial 1710 and the cryogenic shelf 1720, ensures the activity of the temporary biospecimens, and realizes the flexible management of biospecimens.

In one embodiment, as shown in FIG. 7, FIG. 9 and FIG. 14, the cryogenic storage and retrieval apparatus 10 further includes a preprocessing tank 1800 configured to preprocess the biospecimen to be stored in the storage device 100.

In one embodiment, the preprocessing tank 1800 stores a predetermined concentration of protective gas. The pretreatment process can be pre-cooling the biospecimens.

In one embodiment, the protective gas in the preprocessing tank 1800 is a protective gas with gradient concentration, which can realize gradient cooling pretreatment of biospecimens to be stored in the storage device 100.

The cryogenic storage and retrieval apparatus 10 is provided with the preprocessing tank 1800. The preprocessing tank 1800 can realize the realize the pretreatment of biospecimens and prevent the storage effect from being unable to be ensured due to a high temperature difference when the samples are placed into the storage device 100.

In one embodiment, as shown in FIG. 3 and FIG. 4, the storage device 100 is further provided with a power distribution box 1400 configured to provide power support for the storage device 100.

FIG. 16 is a flowchart of a cryogenic storage and retrieval method of an embodiment. The method includes: a corresponding storage device is selected according to a storage and retrieval requirements, the staging tank configured to hold biospecimens is placed into the operating device, the operating device is assembled to the selected storage device, the storage and retrieval of the biospecimen in the storage device is completed through the operating device and staging tank, the operating device is disassembled from the selected storage device, and the selected storage device is sealed. It should be understood that the storage and retrievals requirements can be information of the biospecimen to be stored, or information of biospecimen to be taken out. The information of the biospecimen includes a name of the biospecimen and a number of the biospecimen. When the sample are stored in the storage device, the control system selects the corresponding storage device with storage space according to the number of stored biospecimen, places the staging tank containing biospecimens into the operating device, and assembles the operating device and the storage device. After the assembly, the biospecimens in the staging tank are stored in the storage device through the operating device, finally the operating device and the storage device are disassembled, and the storage device is sealed. When it is necessary to take the required biospecimen out from the storage device, a storage location of the biospecimen is queried according to the name of the required biospecimen, the corresponding storage device is selected according to the storage location of the required sample, the empty staging tank is placed into the operating device, and the operating device and the storage device are assembled. After the assembly is completed, the biospecimen is taken out from the storage device through the operating device and the biospecimen is located in the staging tank, and the staging tank is taken out of the operating device, finally the operating device and the storage device are disassembled, and the storage device is sealed.

In the above cryogenic storage and retrieval method, the storage device and the operating device are disassembled and assembled according to the storage and retrieval requirements. On the premise of ensuring the storage effect of the storage device, the flexible one to many cooperation between the operating device and the storage device is realized, that is, the storage space can be improved only by adding the storage device, and the effective capacity expansion of the storage device can be realized under the limited cost increase.

In one embodiment, after the operating device is assembled to the selected storage device, the transferring tank can also be opened through the operating device.

In one embodiment, prior to assembling the operating device to the selected storage device, the operating device can be moved to a preset position corresponding to the storage device.

In one embodiment, when a biospecimen needs to be stored, the control system receives a storing task of the biospecimen, extracts the information of the biospecimen according to the storing task, and then queries an identification of corresponding storage device according to the information of the biospecimen, select the storage device corresponding to the identification of the storage device. The operating device is driven by the moving device to moves to a preset position corresponding to the selected storage device, opens the sealing device corresponding to the storage device, and the operating device and the storage device are assembled through the quick connect device, a junction of the assembly is sealed and the access cover at the access port is opened, the staging tank is transferred into the operating device through the transferring tank. The first tank opening mechanism or the second tank opening mechanism is controlled to open the tank cover of the transferring tank and the staging tank in turn through the display screen. The tank cover of the staging tank is placed above the transferring tank. The grabbing mechanism is activated, the biospecimen is taken out from the staging tank and kept for three seconds above the board scanning decoder. The quick response code at the bottom of the biospecimen is identified and transmitted into the control system. The grabbing mechanism transfers the biospecimen to the preprocessing tank through the X-axis module and the Y-axis guide rail, the biospecimen is kept in a deep cryogenic environment, and transferred to the upper part of the access port. The storage rack is driven to move to the empty storage member to align with the access port through the rotating assembly on the storage mechanism drives. The grabbing mechanism holds the biospecimen and moves it to the access port to store the biospecimen in the storage device to complete the storage of the biospecimen. When the storage is completed, a first sealing of the storage device is completed through the cooperation of the access cover and the access port. The storage device and the operating device are disassembled, and the sealing device seals the access port to complete a second sealing.

Among them, querying an identification of the corresponding storage device according to the information of the biospecimen refers to obtaining the corresponding storage device according to the name of the biospecimen and the number of biospecimen in the information of the stored biospecimen. It should be understood that the identification of the corresponding operating device can also be queried according to the information of the biospecimen.

In a specific embodiment, when a biospecimen needs to be taken out, the control system receives a retrieving task of the biospecimen, extracts the information of the biospecimen to be retrieved according to the retrieving task, and then queries an identification of corresponding storage device according to the information of the biospecimen, select the storage device corresponding to the identification of the storage device. The operating device is driven by the moving device to move to the preset position corresponding to the selected storage device, the sealing device corresponding to the storage device is opened, and the operating device and the storage device are assembled through the quick connect device. The storage rack is driven to move to the storage member storing the required biospecimen to align with the access port through the rotating assembly on the storage mechanism drives, the junction of the assembly is sealed and the access cover at the access port is opened. The staging tank is transferred into the operating device through the transferring tank, the first tank opening mechanism or the second tank opening mechanism is controlled to open the tank cover of the transferring tank and the staging tank in turn through the display screen, the tank covers of the staging tank is placed above the transferring tank. The grabbing mechanism is activated, the biospecimen is taken out from the staging tank and kept for three seconds above the board scanning decoder. The quick response code at the bottom of the biospecimen is identified and transmitted into the control system. The grabbing mechanism transfers the biospecimen to the staging tank through the X-axis module and the Y-axis guide rail, the biospecimen is stored in the staging tank, and the staging tank is taken out from the transferring tank to complete the retrieval of the biospecimen. When the retrieval is completed, the first sealing of the storage device is completed through the cooperation of the access cover and the access port. The storage device and the operating device are disassembled, and the sealing device seals the access port to complete the second sealing.

Further, in one embodiment, when a biospecimen needs to be taken out, the control system receives the retrieving task of the biospecimen, extracts the information of the biospecimen to be retrieved according to the retrieving task, and then queries an identification of corresponding storage device according to the information of the biospecimen, select the storage device corresponding to the identification of the storage device. The operating device is driven by the moving device to move to the preset position corresponding to the selected storage device, the sealing device corresponding to the storage device is opened, and the operating device and the storage device are assembled through the quick connect device. The storage rack is driven to move to the storage member storing the required biospecimen to align with the access port through the rotating assembly on the storage mechanism drives, the junction of the assembly is sealed and the access cover at the access port is opened. The grabbing mechanism is activated, the biospecimen is taken out from the staging tank and kept for three seconds above the board scanning decoder. The quick response code at the bottom of the biospecimen is identified and transmitted into the control system. The grabbing mechanism transfers the biospecimen above the temporary storage device through the X-axis module and the Y-axis guide rail, the biospecimen is stored in the temporary storage device to complete a reserved temporary storage of the biospecimen. When the temporary storage is completed, the first sealing of the storage device is completed through the cooperation of the access cover and the access port. The storage device and the operating device are disassembled, and the sealing device seals the access port to complete the second sealing. It should be understood that after the reserved temporary storage of the sample is completed, the required biospecimen can be taken directly from the temporary storage device to improve the efficiency of storage and retrieval.

Although certain features and aspects of the exemplary embodiments have been described, those skilled in the art should recognize that many modifications are possible. For example, the methods and processes described herein may be implemented using hardware components, software components, and/or any combination thereof. Further, although various methods and processes have been described for specific structural and/or functional components, the methods provided by the various embodiments described above are not limited to any specific structural and/or functional architecture, but can be implemented on any suitable hardware, firmware and/or software configuration. Similarly, although certain functions are attributed to certain system components, unless the context has other indication, the functions may be distributed among various other system components according to several embodiments.

Furthermore, In order to facilitate to describe, although the methods and processes of the present disclosure are described in a specific order, the various processes may be reordered, added and/or omitted according to various embodiments, unless the context has other indication. Moreover, the processes described with respect to one method or process may be incorporated into other described methods or processes. However, the present disclosure is not limited to this. Similarly, components described according to a particular structural architecture and/or relative to one system may be organized in an alternative structure and/or incorporated into other described systems. Thus, although various embodiments with or without certain features have been described, various components and/or features described herein for specific embodiments may be replaced, added, and/or removed unless the context has other indication. Therefore, although several exemplary embodiments have been described above, it should be understood that the present disclosure is intended to cover all modifications and equivalents within the scope of the disclosure.

What is claimed is:

1. A biospecimen storage and retrieval apparatus, comprising:

a storage device forming a cryogenic environment therein configured to store a biospecimen, the biospecimen comprising a cryovial and a cryogenic shelf configured to hold the cryovial;

an operating device detachably connected to the storage device, wherein the operating device is configured to receive a staging tank configured to hold the biospecimen, and the operating device completes storage and retrieval of the biospecimen in the storage device through the staging tank; and a sealing device configured to seal the storage device when the storage device is detached from the operating device;

wherein the operating device comprises:

a housing forming an operating chamber therein;

a transferring tank configured to transfer the staging tank into the operating chamber;

a tank opening mechanism provided in the operating chamber and configured to open the transferring tank and the staging tank; and a grabbing mechanism configured to grab the biospecimen and place the grabbed biospecimen into the opened transferring tank or the opened storage device;

wherein the grabbing mechanism comprises:

a biospecimen grabbing assembly configured to grab the biospecimen; and a grabbing moving assembly configured to drive the biospecimen grabbing assembly to move;

wherein the grabbing moving assembly comprises:

a Y-axis guide rail slidably connected to the biospecimen grabbing assembly and configured to guide the biospecimen grabbing assembly to slide along a Y-axis;

a Y-axis fixing plate; and an X-axis module slidably connected to the Y-axis guide rail through the Y-axis fixing plate and configured to guide the biospecimen grabbing assembly to slide along an X-axis;

wherein the biospecimen grabbing assembly comprises a suction head guide rail seat, a negative pressure joint, a suction head motor, a suction head lead screw, and a suction head component;

wherein the suction head guide rail seat is slidably connected to the Y-axis guide rail;

wherein the suction head component is provided on a driving end of the suction head lead screw;

wherein the suction head motor is configured to drive the suction head lead screw to drive the suction head component to slide along the suction head guide rail seat;

wherein the negative pressure connector is configured to generate negative pressure; and wherein the suction head component sucks the cryovial under the negative pressure.

2. The biospecimen storage and retrieval apparatus according to claim 1, further comprising a moving device and a quick connect device, wherein the moving device is configured to drive the operating device to a preset position corresponding to the storage device, and the quick connect device is configured to assemble the operating device and the storage device.

3. The biospecimen storage and retrieval apparatus according to claim 1, wherein the tank opening mechanism comprises:

a first tank opening assembly configured to open the transferring tank and the staging tank; and a tank opening moving assembly configured to drive the first tank opening assembly to move above the transferring tank and the staging tank.

4. The biospecimen storage and retrieval apparatus according to claim 3, wherein the first tank opening assembly comprises a tank opening fixing seat, a telescopic electromagnet, a spring, and an electromagnet, the tank opening fixing seat is provided on a driving end of the tank opening moving assembly, the electromagnet is fixedly connected to the tank opening fixing seat, the telescopic electromagnet is slidably connected to the tank opening moving assembly, the spring is provided between the telescopic electromagnet and the electromagnet.

5. The biospecimen storage and retrieval apparatus according to claim 1, wherein the storage device comprises:

a tank body;

a tank cover provided above the tank body, wherein a sealed storage chamber is formed between the tank cover and the tank body, the tank cover is provided with an access port configured to allow the biospecimen to pass;

an access cover cooperated with the access port to seal the storage device; and a storage mechanism rotatably supported in the storage chamber and configured to place the biospecimen.

6. The biospecimen storage and retrieval apparatus according to claim 5, wherein the storage mechanism comprises:

a storage rack provided with a storage hole;

a storage member latched in the storage hole and configured to place the biospecimen; and a rotating assembly configured to drive the storage member to rotate to the access port through the storage rack.

7. The biospecimen storage and retrieval apparatus according to claim 6, wherein the storage hole is a circular aluminum tube hole configured to store the cryovial, and the storage member is a circular limiting tube configured to store the cryovial.

8. The biospecimen storage and retrieval apparatus according to claim 6, wherein the storage hole is a rectangular aluminum tube hole configured to store the cryogenic shelf, and the storage member is a rectangular limiting tube configured to store the cryogenic shelf.

9. The biospecimen storage and retrieval apparatus according to claim 5, wherein the sealing device comprises a sealing cover, the sealing cover is rotatably connected to the tank cover, the sealing cover is provided with a sealing port corresponding to the access port, the sealing cover is provided with a first sealing surface, and the tank body is provided with a second sealing surface, when the first sealing surface coincides with the second sealing surface, the sealing port, the access port, and the access cover cooperatively seal the storage device.

10. The biospecimen storage and retrieval apparatus according to claim 9, wherein a top of the tank cover is provided with a sealing groove matching a size of the sealing cover, the second sealing surface is located at a bottom of the sealing groove, when the first sealing surface coincides with the second sealing surface, a side of the sealing groove cooperates with a side of the sealing cover to seal the storage device.

11. The biospecimen storage and retrieval apparatus according to claim 9, wherein the sealing cover and the tank cover are rotatably connected through a rotating member, the rotating member is provided with a rotating driving member configured to drive the sealing cover to rotate relative to the storage device.

12. The biospecimen storage and retrieval apparatus according to claim 1, further comprising:
    a temporary storage device provided inside the operating chamber, wherein a cryogenic environment configured to temporarily store the biospecimen is provided inside the temporary storage device.

13. The biospecimen storage and retrieval apparatus according to claim 1, further comprising:
    a preprocessing tank configured to preprocess the biospecimen to be stored in the storage device.

14. A biospecimen storage and retrieval apparatus, comprising:
    a storage device forming a cryogenic environment therein configured to store a biospecimen, the biospecimen comprising a cryovial and a cryogenic shelf configured to hold the cryovial;
    an operating device detachably connected to the storage device, wherein the operating device is configured to receive a staging tank configured to hold the biospecimen, and the operating device completes storage and retrieval of the biospecimen in the storage device through the staging tank; and
    a sealing device configured to seal the storage device when the storage device is detached from the operating device;
    wherein the operating device comprises:
        a housing forming an operating chamber therein;
        a transferring tank configured to transfer the staging tank into the operating chamber;
        a tank opening mechanism provided in the operating chamber and configured to open the transferring tank and the staging tank; and
        a grabbing mechanism configured to grab the biospecimen and place the grabbed biospecimen into the opened transferring tank or the opened storage device;
    wherein the grabbing mechanism comprises:
        a biospecimen grabbing assembly configured to grab the biospecimen; and
        a grabbing moving assembly configured to drive the biospecimen grabbing assembly to move;
    wherein the grabbing moving assembly comprises:
        a Y-axis guide rail slidably connected to the biospecimen grabbing assembly and configured to guide the biospecimen grabbing assembly to slide along a Y-axis;
        a Y-axis fixing plate; and
        an X-axis module slidably connected to the Y-axis guide rail through the Y-axis fixing plate and configured to guide the biospecimen grabbing assembly to slide along an X-axis; and
    wherein the biospecimen grabbing assembly comprises:
        a gripper structure configured to grasp the biospecimen, wherein the gripper structure comprises a gripping arm, a transmission component, and a gripper component, the transmission component is located at one end of the gripping arm, the transmission component is provided with an input end configured to receive a driving force, the transmission component is capable of converting a driving force received through the input end along an extension direction of the gripping arm into a driving force perpendicular to the extension direction of the gripping arm, the transmission component is further provided with an output end configured to output the converted driving force, the gripper component is provided on the output end, the gripper component comprises a first jaw and a second jaw, and a clamping space configured to grip the biospecimen is provided between the first jaw and the second jaw, the first jaw and the second jaw are capable of moving along a direction perpendicular to the extension direction of the gripping arm under a driving of the transmission component, and movement directions of the first jaw and the second clamping jaw are opposite;
        a drive motor; and
        a driving guide rail, wherein the gripper structure is driven by the drive motor to move along the drive guide rail to adjust positions of the gripper structure and the biospecimen in a Z-axis direction.

15. A biospecimen storage and retrieval apparatus, comprising:
    a storage device forming a cryogenic environment therein configured to store a biospecimen, the biospecimen comprising a cryovial and a cryogenic shelf configured to hold the cryovial;
    an operating device detachably connected to the storage device, wherein the operating device is configured to receive a staging tank configured to hold the biospecimen, and the operating device completes storage and retrieval of the biospecimen in the storage device through the staging tank; and
    a sealing device configured to seal the storage device when the storage device is detached from the operating device;
    wherein the operating device comprises:
        a housing forming an operating chamber therein;
        a transferring tank configured to transfer the staging tank into the operating chamber;
        a tank opening mechanism provided in the operating chamber and configured to open the transferring tank and the staging tank; and
        a grabbing mechanism configured to grab the biospecimen and place the grabbed biospecimen into the opened transferring tank or the opened storage device;
    wherein the tank opening mechanism comprises:
        a first tank opening assembly configured to open the transferring tank and the staging tank; and
        a tank opening moving assembly configured to drive the first tank opening assembly to move above the transferring tank and the staging tank;

wherein the first tank opening assembly comprises a tank opening fixing seat, a telescopic electromagnet, a spring, and an electromagnet;

wherein the tank opening fixing seat is provided on a driving end of the tank opening moving assembly;

wherein the electromagnet is fixedly connected to the tank opening fixing seat;

wherein the telescopic electromagnet is slidably connected to the tank opening moving assembly; and wherein the spring is provided between the telescopic electromagnet and the electromagnet.

* * * * *